Dec. 1, 1959  F. DE CHANGY  2,914,958

VARIATOR FOR CALCULATING MACHINES

Filed Jan. 17, 1955  4 Sheets-Sheet 1

Dec. 1, 1959    F. DE CHANGY    2,914,958
VARIATOR FOR CALCULATING MACHINES
Filed Jan. 17, 1955    4 Sheets-Sheet 2

Dec. 1, 1959        F. DE CHANGY        2,914,958

VARIATOR FOR CALCULATING MACHINES

Filed Jan. 17, 1955        4 Sheets-Sheet 3

Dec. 1, 1959  F. DE CHANGY  2,914,958
VARIATOR FOR CALCULATING MACHINES
Filed Jan. 17, 1955  4 Sheets-Sheet 4

United States Patent Office 2,914,958
Patented Dec. 1, 1959

2,914,958

VARIATOR FOR CALCULATING MACHINES

Francois de Changy, Clamart, France

Application January 17, 1955, Serial No. 482,348

Claims priority, application France May 14, 1954

4 Claims. (Cl. 74—344)

This invention relates in general to calculating machines and particularly to a variator mechanism for calculating machines, that is, a device adapted, when it is associated with any counting or calculating machines, to correct the counted, reckoned or calculated quantity as a function of one or more correction factors selected at will, these factors varying in a continuous or intermittent manner and more or less rapidly.

A variator according to this invention may be used in many different applications, for example for correcting the consumption of a gas flowing through a duct as a function of its temperature and heat value, or the consumption of hot water delivered through a pipe as a function of its temperature, etc.

If more than one correction factor must be taken into account, the variator arrangement will comprise as many variator units, for example of same design and characteristics, which are arranged in series.

A typical variator according to this invention comprises a rigid correcting gear set driven from the input shaft of the variator, this correcting gear set consisting of a number of juxtapositioned gears having the same circular and diametral pitches. The number of teeth of each gear increases by two teeth from one gear to the next adjacent one, each gear having one fraction of its outer surface consisting of a plain or toothless sector forming a cylinder portion of a diameter slightly smaller than the pitch circle of the gear. The variator comprises a driven pinion having a circular pitch the same as the gears of the input gear set. Every other tooth of the driven pinion is cut down to the pitch circle. The driven pinion is mounted on a shaft parallel to that of the correcting gear set in order to cause its teeth to mesh with those of said correcting gear set. Means for causing the driven pinion to move along its axis in a manner responsive to the desired correction factor are provided so that it will mesh with one or the other of the gears of said gear set. This variation may be completed if desired by an output gear of the same width as the correcting gear set which is in constant meshing engagement with said driven pinion irrespective of the axial position of the driven pinion. The output is provided with the same number of teeth and the same circular pitch, but without any truncated teeth.

Assuming that the intermediate gear of said correcting gear set has the same number of teeth as the driven pinion and that they are in meshing engagement, each time the correcting gear set accomplishes a full revolution the driven pinion will also accomplish a full revolution and therefore no correction will be introduced in the operation of the counter. However, if the driven pinion is disposed for engagement with another gear of said correcting gear set, for each complete revolution of said correcting gear set the driven pinion is rotated through one revolution plus or minus one fraction of a revolution; thus, a correction is obtained and the value of this correction is proportional to the number of teeth of the gear of the correcting gear set in meshing engagement with said driven pinion. In other words, the rate of correction thus applied to the input value is equal to the ratio of this number of teeth to the number of teeth of the intermediate gear providing the 1:1 ratio. Thus, a correcting gear set comprising eleven gears will provide eleven rates of correction ranging from .5 to 1.5 at .1's intervals, the intermediate ratio being the unit. It will be readily understood that any other ratios and ratio intervals may be obtained by using the same principle.

As the driven pinion might engage and mesh with two adjacent gears of the correcting gear set, it can drive one of them, namely the one having the greatest number of teeth while holding the other against motion; since both gears are rotatably fast with each other, a breakage would take place. To avoid this inconvenience, according to the present invention, all the teeth are aligned on one side of the input gear set and on the other side each gear comprises on the initial portion of its plain cylindrical portion a sector, corresponding to an angle or arc corresponding to two adjacent teeth which are cut down to the gear root circle. Thus, the driven pinion may slide in and out freely even if it is straddling two adjacent gears of the input gear set.

With a device of this character the correction is always effected. It is also possible to improve the precision of the correction by suppressing the sector cut down to the root circle and utilizing an aligning regulator, but the assembly thus obtained is considerably more complicated.

However, in many cases the torque available at the input shaft is inadequate to drive the correcting gear set, the output shaft of the variator which is driven by said gear set and the recorder unit mounted on said output shaft of the variator. In this case a driving shaft driven for continuous rotation from any suitable external source of power is employed. In this case the variator, according to this invention, is completed by a driving block adapted to cause the correcting gear set to accomplish a full and single revolution upon each revolution of the input shaft.

To this end, the correcting gear set is rotatably fixed with an input gear of which every other tooth is truncated down to the pitch circle. A driving block mounted on a shaft parallel to that carrying the input gear is provided, and of which the different elements are rotatably and axially solid with one another and are adapted to slide on said shaft. The driving block on the one hand comprises a gear having the same number of teeth as the input gear and which is in meshing engagement therewith (however, the teeth of this gear occupy only one portion of the gear periphery, the remaining portion being plain and constituting a cylindrical surface of a diameter very slightly inferior to the pitch diameter of the toothed portion), and on the other hand a disc having the same diameter as said plain portion. The input gear of the correcting gear set is normally held against movement by said disc. This driving block is driven for continuous rotation from a driving shaft and adequate means are provided for causing the driving block to slide in such a manner as to cause said gear to become substantially co-planar with the input gear of the correcting gear set each time the input shaft of the variator accomplishes a predetermined number of revolutions and to restore this driving block to its initial position so that the disc associated therewith will register with the input gear of the correcting gear set to lock same against movement immediately as said driving block has rotated the input gear of the correcting gear set through one and only revolution. These means may be of different types and are driven from the driving shaft and actuated by the input shaft of the variator.

Thus, these means may consist of a trip-device cooperating with a cam portion of the driving block which engages a spring loaded pin responsive to the input shaft of the variator and adapted to be set in two opposite positions of stable equilibrium, i.e. an operative position and an inoperative position. In the inoperative position of this spring loaded pin the cam portion of the driving block is not acted upon. In the operative position the spring loaded pin co-acts with the cam portion of the driving block so as to displace the driving block such that the latter carries along the correcting gear set through a complete and single revolution, whereupon the cam portion and the whole driving set are restored to their inoperative position. The spring loaded pin is then restored to its inoperative position by the cam portion of the driving block but the driving block remains capable of rotating without carrying along the correction gear set, until the input shaft restores the spring loaded pin to its operative position and a fresh impulse take place.

In order to afford to clearer understanding of the manner in which the invention may be carried out in practice, reference will now be made to the attached drawings forming part of this specification and illustrating diagrammatically by way of example a typical form of embodiment of a variator constructed according to the teachings of this invention. In the drawings—

Figure 9:
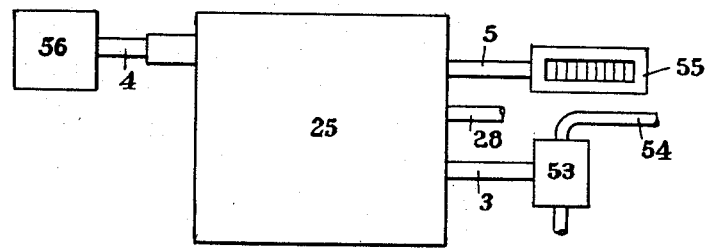
Fig. 9 is a plane view showing diagrammatically on a smaller scale the mounting of the variator on the counter with which it is associated.

As shown diagrammatically in Fig. 9, the variator according to this invention, which is enclosed for example in a case 25, is used jointly with a counter. This counter of conventional design comprises in a case 53 a rotatably driven element actuated by the delivery movement effected by the material the consumption of which is to be measured, for example, in the case of the delivery of a fluid, by the stream of this fluid in a duct 54 which may be the delivery duct proper or a branch leading therefrom. The counter comprises in addition a register housed in a case 55 normally formed with a window in which the value of the consumed product is permanently inscribed from the preceding resetting of the counter. In the conventional arrangement the register is constantly driven from a counting shaft 3 keyed on the rotary element of the case 53. According to this invention, this shaft 3 constitutes the input shaft of the variator and the register 55 is actuated from an output shaft 5 of the variator which, during a predetermined time period, performs a number of revolutions which is proportional both to the number of revolutions of the input shaft 3 and to a correction coefficient the value of which is determined within a certain interval by a longitudinally sliding shaft 28. This sliding shaft 28 may be actuated either by hand, at will, or automatically and permanently by a measuring instrument, for example a thermometer in case the recording unit is to reckon the heat units corresponding to the delivery of a hot liquid. The variator comprises in addition a driving shaft 4 constantly rotated for example from a motor 56 to supply the power necessary for the operation of the mechanism which is thus controlled by the shaft 3 by means of the moderate efforts consistent with the proper operation of the frequently delicate rotary member whereby this shaft 3 is rotated in the case 53.

The variator illustrated in the drawings (Fig. 1) comprises a variator mechanism proper designated generally by the reference numeral 1, and a driving mechanism 2, the variator mechanism being driven from the driving mechanism driven in turn from the driving shaft 4 under the control of the input shaft 3 the variator mechanism driving the output shaft 5 adapted to control the register 55.

The input shaft 3 drives the driving mechanism 2 through the medium of a pair of meshing gears 6, 7 providing a reducing ratio. Gear 7 is keyed on a shaft 8 rotatably rigid with a worm 9 meshing in turn with a worm wheel 10. Under these conditions this worm wheel 10, driven with a predetermined reducing ratio from the counter (for example with a 100:1 reduction ratio) releases, through the medium of a trip device to be described later herein with reference to Fig. 6, each time it has accomplished a predetermined number of revolutions, the driving mechanism 2 whereby the latter causes the transmission shaft leading to and controlling the variator mechanism to perform a single and full revolution.

In the driving mechanism 2 a driving shaft 4 has keyed thereon a driving pinion 11 in constant mesh with a toothed wheel 12 of a width sufficient to this end. The wheel 12 is part of a driving block comprising a cam portion 13 co-acting with the spring loaded pin 14 of the aforesaid trip device. The mechanism 2 further comprises a gear 15 formed with a plain or toothless sector 16 of a diameter very slightly smaller than the pitch diameter of gear 15, and a plain disc 17 of the same diameter as the aforesaid toothless sector 16. The plain disc 17 is surrounded by thin washers 18 of a diameter slightly greater than the outer diameter of gear 15, except for the washer portion adjacent to the plain sector 16 of gear 15.

Figure 3:
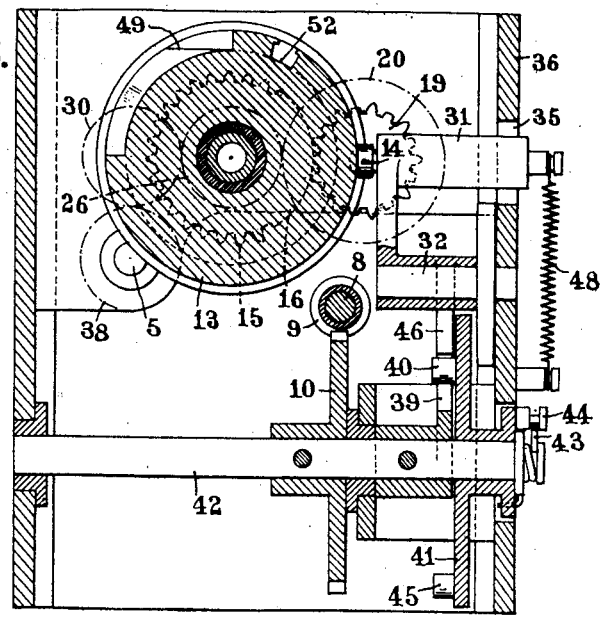
Figure 4:
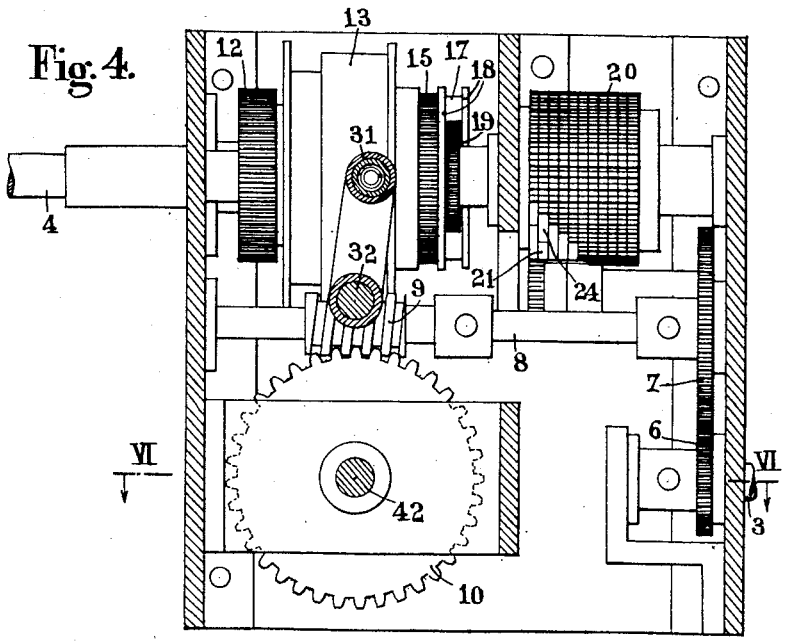
Figs. 4 and 5 are longitudinal sections taken upon the lines IV—IV and V—V of Fig. 1.
Figure 5:
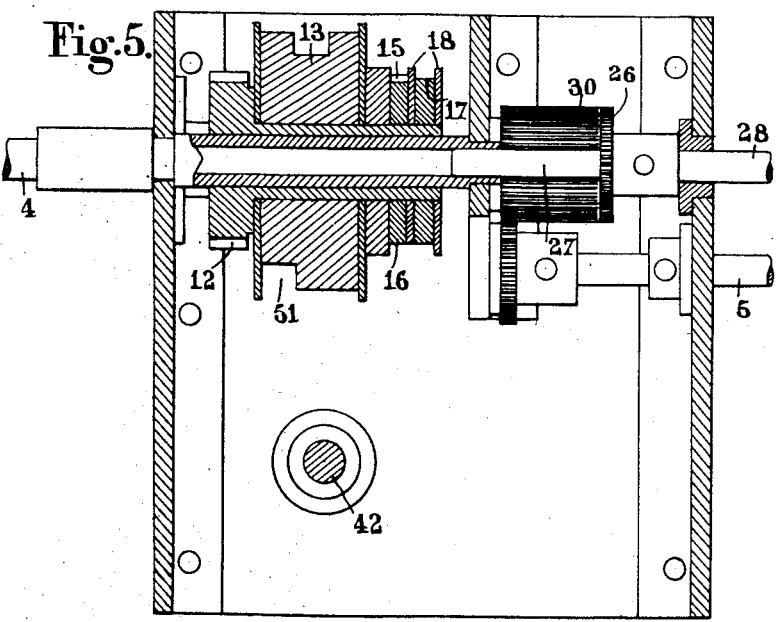

The correcting gear set comprises an input pinion 19 of which every other tooth is truncated down to the pitch circle and this pinion 19 is adapted, according to the position of the driving set, to co-act either with the gear 15 or with the disc 17 of this driving set. The number of teeth and diametral pitch of the gear 15 are the same as those of pinion 19, whereby each time the former is meshing with the latter it causes the pinion 19 and therefore the whole correcting gear set 20 to perform a complete revolution but only one revolution since the arrangement of the trip-device and cam portion 13 of the driving block is such, as will be explained presently, that gear 15 cannot mesh with pinion 19 beyond this single revolution. On the other hand, when the pinion 19 co-acts with the disc 17 the latter locks the same in its angular position due to the fact that this pinion 19 has every other tooth truncated down to the pitch circle, as shown in Fig. 3.

Figure 7:
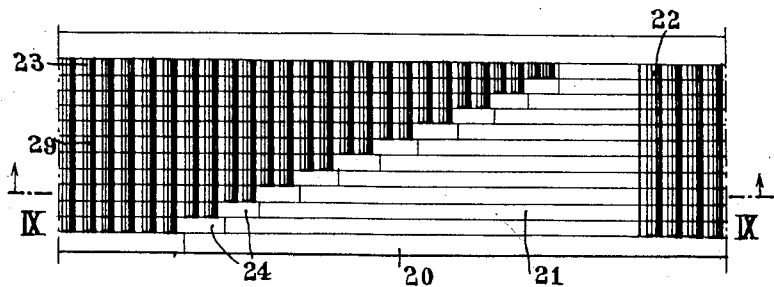
Figs. 7 and 8 are developed views showing in plan and in a sectional view respectively the correcting gear set.
Figure 8:
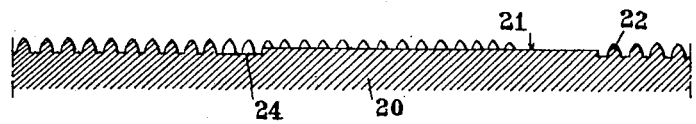

The correcting gear set 20 shown in developed form in Figs. 7 and 8 consists in the case considered herein of eleven juxtapositioned gears rotatably fast to one another and of same diameter, all of which are formed with a plain or toothless sector 21 of a diameter slightly smaller than the pitch diameter and having a number of teeth increasing by two from one gear to the next one. In the case illustrated this number of teeth increases by two, from ten to thirty. The first teeth 22 of these different gears are aligned on a common generatrix and the last teeth are spaced one circular pitch from each other, as shown. Moreover, the last tooth of each gear, except that of gear 23 which has the greatest number of teeth, is followed by a cavity 24 corresponding to an angle of two teeth (or two circular pitches) and of a depth at least equal to the tooth depth.

This correcting gear set 20 is adapted to move a pinion 26 having its hub slidably mounted on a shaft 27 and controlled in the axial direction by a sliding member 28 responsive to the correction factor whereby the pinion 26 will mesh with that gear of the correcting gear set 20 which will provide the rate of correction corresponding to this factor. In the case considered herein the driven gear has twenty teeth so that the correction ratio may vary from .5 to 1.5 and notably be equal to the unit when the driven pinion 26 meshes with the intermediate gear 29 of the corrector gear set which has also twenty teeth. It will be readily understood that as the driven pinion 26 is meshing with one of the gears of the correcting gear set, when the latter performs a complete revolution about its axis it causes the driven pinion 26 to rotate through an angular distance corresponding to the number of teeth of this gear, whereupon the plain sector 21 of this gear will lock the pinion 26 in the angular position thus obtained. When the driven pinion 26 straddles two adjacent gears of the correcting gear set the engagement of the first teeth 22 is not attended by any difficulty as they are aligned, and their disengagement is also trouble-free, for, as long as the driven pinion 26 is in meshing engagement with the last two teeth of that gear of the pair which has the greatest number of teeth, this pinion engages not the plain sector 21 of the other gear with which it is also in meshing engagement and by which it would be locked in its angular position, but with the cavity 24 corresponding to the aforesaid last two teeth.

The driven pinion 26 is in constant meshing engagement with an output pinion 30 of the variator. This output pinion of the variator has the same number of teeth and pitch diameter as the driven pinion 26, and the same width as the correcting gear set 20. Pinion 30 is rotatably fast with the output shaft 5 of the variator due to the interposition of adequate gears 38.

The trip-device comprises a socket 31 pivoted on a pin 32 and adapted to be held by a tension spring 48 in two alternate positions of stable equilibrium in which it engages one or the other of two opposite edges 33, 34 of a window 35 through which said socket extends. This window 35 is formed through the wall 36 of the case of the device, as shown. A pin 14 slidably mounted in the socket 31 is constantly urged by a spring 37 into engagement with the cam portion 13 of the driving block.

Figure 6:
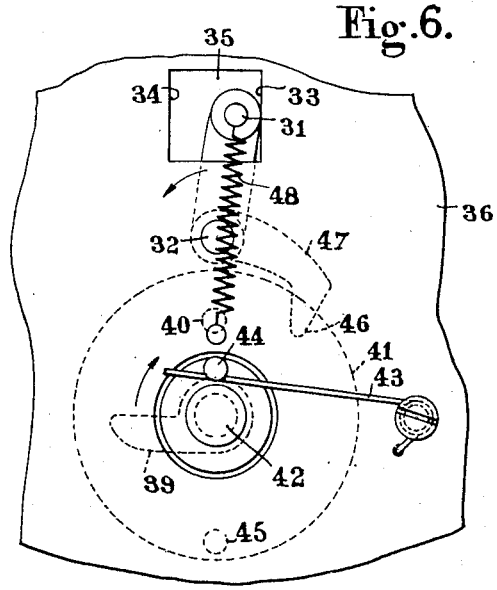
Fig. 6 is a fragmentary front view showing the detail of the trip device.

The worm wheel 10 driven from the worm 9 is rotatably fast with an arm 39 adapted to engage a pin 40 carried by a disc 41 mounted for loose rotation on a common shaft 42, a spring 43 co-acting with the pin 44 secured on said disc 41 constantly urging the latter to its position of equilibrium in which it is shown in Fig. 6. Thus, when the arm 39 engages the pin 40 it bears against and carries along the disc, thereby causing the pin 44 to wind up the spring 43. Immediately as the pin 44 oversteps the position symmetrical to that in which it is shown in Fig. 6 the spring 43 expands and rotates the disc 41 rapidly through the medium of pin 44 so as to restore the disc to its position of equilibrium. During this quick return movement another pin 45 carried by the disc 41 in a more eccentric position engages the bent outer portion 46 of an arm 47 fast with the socket 31, whereupon the latter is caused to rotate in the direction of the arrow of Fig. 6 until it engages the left-hand edge 34 of window 35 and remains in this operative position.

Figure 1:
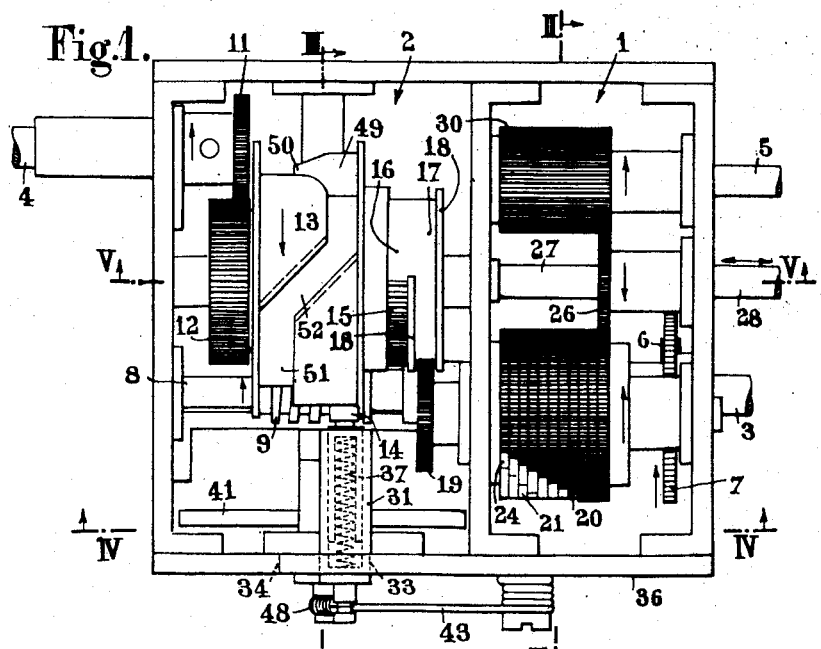
Fig. 1 is a plan view showing the variator without the cover plate.
Figure 2:
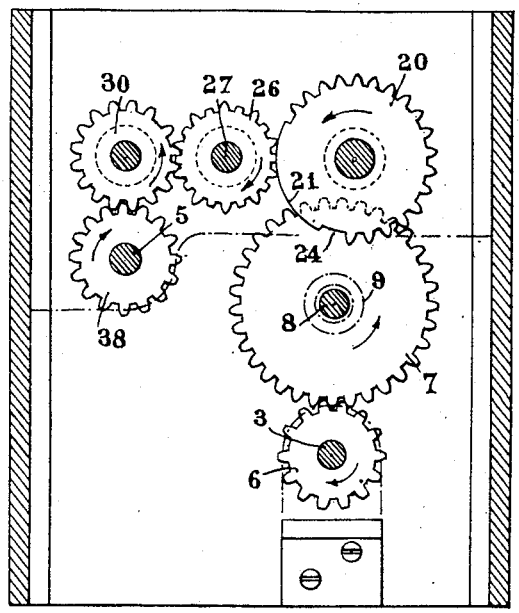
Figs. 2 and 3 are cross-sectional views taken upon the lines II—II and III—III of Fig. 1 respectively.

When the socket 31 is in its inoperative position, that is, urged by the spring 48 against the right-hand edge 33 of window 35, the pin 14 slides freely on the outer peripheral surface of cam portion 13, drops into the rectilinear portion of the cam groove (Fig. 1) and rises along the rectilinear flat ramp 49 thereof (Figs. 1 and 3) from which it follows again the outer peripheral surface of the cam; consequently, this cam portion 13 remains in its inoperative position shown in Fig. 1 and the disc 17 registers with the pinion 19 held against rotation. Thus, the driving shaft 4 causes the cam portion 13 to rotate without occasioning any movement in the correcting gear set.

However, when the socket 31 has been pushed to its operative position by the trip-device responsive to the input shaft 3 of the variator, that is, against the left-hand edge 34 of window 35 by the spring 48 so that its spring-loaded pin 14 engages the inclined portion 50 of the groove formed in the cam portion 13 of the driving block, the driving block moves axially to the right, thus causing the plain sector 16 of gear 15 to register with the input pinion 19 of the correcting block. Thereafter, the cam portion 13 is held in this operative position by the rectilinear portion 51 of its groove engaged by the spring loaded pin 14 and the gear 15 of the driving block causes the input pinion 19 of the correcting gear set and therefore said correcting gear set 20 to perform a single and full revolution. The spring loaded pin 14 may thus subsequently engage the inclined portion 52 of the cam groove to cause firstly the tilting of socket 31 about its pivot pin 32 and then, as the socket 31 engages the right-hand edge 33 of window 35, this inclined portion 52 of the cam groove bears against the spring loaded pin 14 to move the cam in the left-hand direction and therefore restore the whole driving block to its inoperative position as shown in Fig. 1.

The inclined portion 52 of the groove of cam 13 is formed along the outer edge of each side wall with an inwardly projecting lip visible in Fig. 3 so that in the operative position the spring-loaded pin 14 may travel over this inclined portion 52 without falling into the bottom of the groove. This fall occurs always before the bolt engages the groove portion 50 inclined in the opposite direction.

From the foregoing it is clear that with the device of this invention in all circumstances and irrespective of the moment at which the trip-device is actuated, and whether an unforeseen stoppage of the input shaft 3 or of the driving shaft 4 takes place, the correcting gear set 20 cannot perform more than a complete and single revolution each time the release device is actuated.

The variator described hereabove and arranged as shown in Fig. 9 operates as follows:

The input shaft 3 of the variator which is driven continuously from the rotary member mounted in the case 53 transmits through the pinion 7, shaft 8 of worm 9 and worm wheel 10 a relatively slow, continuous rotary movement to the shaft 42 of which each revolution controls one cycle of operation of the variator. This cycle begins when the arm 39 fast with the shaft 42 has carried along through more than half a revolution the pin 40 solid with the disc 41 rotatably mounted on the same shaft. In fact, at that time the spring 43 engaging the crank pin 44 solid with said disc puts said disc 41 in the same direction in a further rapid half revolution during which another pin 45 of said disc 41 causes the pawl or crank lever 47 to tilt and move the socket 31 which is then retained by a spring 48 in its left-hand position in which it engages the edge 34 of the window 35.

The resilient push member or spring-loaded pin 14 projecting from the inner end of socket 31, instead of engaging during the continuous rotation of the driving gear set the flat face 49 of this set, engages the ramp of cam face 50 inclined laternally to constitute a substantially frusto-conical surface. Thus, this spring-loaded pin 14, by sliding in the longitudinal direction, will move the driving block and therefore the toothed sector 15 of said driving block will mesh with the input pinion 19 of the correcting gear set to cause said pinion to perform a complete revolution. The whole correcting gear set 19, 20 will also accomplish a complete revolution during which it rotates the pinion 26 through an angular movement the amplitude of which is proportional to the number of teeth of that elementary pinion of the correcting gear set with which the pinion 26 has been caused to mesh as a consequence of the actuation of the sliding gear 26. This angular movement is transmitted without any modification to the output shaft 5 of the variator through the medium of the long pinion 30 having the same number of teeth as the sliding gear 26.

The following cycle of operation takes place again when the shaft 42 has performed a complete revolution. Under these conditions, it will be seen that the output shaft 5 of the correcting mechanism which actuates the recording unit 55 accomplishes a number of revolutions proportional to the number of teeth of the elementary pinion of the correcting gear set which has been set in its operative position by the actuation of the sliding member 28, for each series of number of revolutions of the input shaft 3 of the variator which corresponds to one revolution of the shaft 42.

It will be readily understood by anybody skilled in the art that the trip-device described hereabove with reference to the attached drawings has been given by way of example only and that any other device providing the same results may be substituted therefor without departing from the spirit and scope of the invention as set forth in the appended claims.

What I claim is:

1. In a counter having a counting shaft and a register that indicates continuously the number of revolutions by which said counting shaft has been rotated from a given initial moment, a variator disposed between said counting shaft and said register, said variator having an input shaft rigidly connected to the countng shaft, an output shaft actuating the register, and a slide member slidable to a plurality of positions each corresponding to a given correction factor for modifying the data carried by said register, said variator comprising a correcting system incorporating an input pinion and means responsive to the positions of said slide member to cause said variator output shaft to be driven from said input pinion and for each revolution of said input pinion by a number of revolutions proportional to the coefficient of correction corresponding to the position of said slide member, a driving system incorporating a driving shaft driven for continuous rotation and a driving block actuated by said driving shaft for continuous rotation, said driving block being operable to an inoperative position and an operative position wherein one revolution of said driving block causes the aforesaid input pinion of said correcting system to be driven through one revolution, and a trip-device operable by the input shaft to an inoperative position and an operative position in which it moves said driving block to its operative position, said trip-device being operable to its operative position by said input shaft each time said input shaft has accomplished a same number of revolutions subsequent to the preceding setting of said trip-device to its operative position, and means to restore the trip to its inoperative position under control of said driving block when the block completes a revolution subsequent to the setting of said driving block to its operative position.

2. In a counter having a counting shaft and a register that indicates continuously the number of revolutions by which said counting shaft has been rotated from a given initial moment, a variator disposed between said counting shaft and said register, said variator having an input shaft rigidly connected to the counting shaft, an output shaft actuating said register and a slide member slidable to a plurality of positions each corresponding to a given correction factor for modifying data in the register, said variator comprising a correcting system incorporating a rigid correcting gear set mounted for rotation about a shaft parallel to said output shaft and formed with an input pinion of said correcting system and a number of correcting pinions, said correcting pinions having substantially the same pitch diameters, pitch circles and width, the number of teeth of said correcting pinions increasing progressively by two teeth from one pinion to the next, larger pinion, each of said correcting pinions having a peripheral toothless portion forming cylindrical surface, said portion having a diameter slightly smaller than the pitch diameter of the corresponding pinion, a fixed shaft on which said slide member is mounted for rotary and axial motion, a driven pinion rigid with said slide member, said driven pinion having the same pitch diameter and a width slightly smaller than each of said adjacent pinions of said correcting gear set, every other tooth of said driven pinion being truncated down to the pitch diameter, and an output pinion keyed on said variator output shaft, said output pinion having the same width as said plurality of adjacent pinions of said correcting gear set and meshing with said driven pinion for any position thereof, as controlled by said slide member, a driving system comprising a driving shaft to which a continuous movement of rotation is imparted and a driving block actuated from said driving shaft for continuous rotation thereof, said driving block being positionable in an inoperative position and an operative position wherein in one revolution said driving block causes said input pinion of said correcting system to rotate through one revolution, and a trip-device adapted to occupy either an inoperative position or an operative position in which it causes said driving block to move towards its operative position, said trip-device being moved to its operative position by said input shaft each time said input shaft has accomplished a same number of revolutions subsequent to the preceding setting in operative position of said trip-device, and restored to its inoperative position when said driving block has accomplished one revolution subsequent to the setting of said driving block to its operative position.

3. A variator according to claim 1, wherein the first teeth in the direction of rotation of each correcting pinion are aligned with one another along a generatrix of the cylindrical surface of the correcting gear set which is not occupied by said teeth, and preceded by a notch cut along said generatrix and of said shape as the bottom of the interval separating two successive alignments of teeth of said pinions, and wherein the last teeth of each of said correcting pinions is followed by a notch cut in said cylindrical surface and widened to the extent of two pitches of the aforesaid teeth relative to the notch preceding the first line of teeth.

4. In a counter having a counting shaft and a register that indicates continuously the number of revolutions by which said counting shaft has been rotated from a given initial moment, a variator adapted to be inserted between said counting shaft and said register, said variator having an input shaft rigidly connected to said counting shaft, an output shaft actuating the register and a slide member of which each position modifies the data carried by said register by assigning to them a certain coefficient of correction, said variator comprising a correcting system incorporating an input pinion having every other tooth truncated down to its pitch diameter, and means responsive to the position of said slide member to rotate said variator output shaft from and upon each revolution of said input pinion by a number of revolutions proportional to the coefficient of correction corresponding to the position of said slide member, a driving system incorporating a driving pinion keyed on said driving shaft, said driving shaft having its axis parallel to that of said input pinion of said correcting system and a driving block mounted for rotational motion about, and sliding motion along an axis parallel to said axis of said driving shaft, said driving block having a circularly toothed portion meshing with said driving pinion irrespective of the longitudinal position of said driving block, a cam-forming portion, and a cylindrical portion carrying on one fraction of the periphery of one portion of its width a set of projecting teeth comprising as many teeth as said input pinion of said correcting system, adapted to mesh with said input pinion for an operative longitudinal position of said driving block, the aforesaid cylindrical portion having a diameter very slightly smaller than the pitch diameter of the teeth carried by said cylindrical portion, and a trip-device incorporating a spring-loaded pin constantly urged against the cam-portion of said driving block, said pin being adapted to occupy either an inoperative position in which it enables said driving block to rotate while remaining in an inoperative longitudinal position, or an operative position in which it moves said driving block longitudinally towards it operative position, said trip-device causing said pin to move towards its operative position under the control of said variator input shaft each time said shaft has accomplished the same number of revolutions subsequent to the preceding movement of said pin towards its operative position, said driving block restoring said trip-device pin to its inoperative position when said driving block has accomplished one revolution in its operative position.

References Cited in the file of this patent

UNITED STATES PATENTS

| | | |
|---|---|---|
| 1,150,785 | Morton et al. | Aug. 17, 1915 |
| 1,811,624 | Ford | June 23, 1931 |
| 1,829,594 | Hugershoff | Oct. 27, 1931 |
| 1,841,517 | Beaney | Jan. 19, 1932 |
| 2,323,415 | Overbury | July 6, 1943 |
| 2,443,064 | Bliss | June 8, 1948 |
| 2,618,983 | Bliss | Nov. 25, 1952 |

FOREIGN PATENTS

| | | |
|---|---|---|
| 851,464 | France | Oct. 2, 1939 |